(12) United States Patent
Van Den Bergen et al.

(10) Patent No.: US 10,112,426 B2
(45) Date of Patent: Oct. 30, 2018

(54) MANUFACTURING METHODS OF DECORATIVE LAMINATES BY INKJET

(71) Applicants: AGFA NV, Mortsel (BE); Unilin BvbA, Wielsbeke (BE)

(72) Inventors: Patrick Van Den Bergen, Mortsel (BE); Johan Van Hunsel, Mortsel (BE)

(73) Assignees: AGFA NV, Mortsel (BE); UNILIN BVBA, Wielsbeke (BE)

( * ) Notice: Subject to any disclaimer, the term of this patent is extended or adjusted under 35 U.S.C. 154(b) by 0 days.

(21) Appl. No.: 15/517,058

(22) PCT Filed: Oct. 22, 2015

(86) PCT No.: PCT/EP2015/074537
§ 371 (c)(1),
(2) Date: Apr. 5, 2017

(87) PCT Pub. No.: WO2016/066531
PCT Pub. Date: May 6, 2016

(65) Prior Publication Data
US 2017/0297354 A1    Oct. 19, 2017

(30) Foreign Application Priority Data

Oct. 31, 2014 (EP) .................................... 14191197

(51) Int. Cl.
*B41M 1/18* (2006.01)
*B41M 7/00* (2006.01)
(Continued)

(52) U.S. Cl.
CPC .............. *B41M 1/18* (2013.01); *B41J 3/4078* (2013.01); *B41M 5/0011* (2013.01); *B41M 7/009* (2013.01); *D06P 5/30* (2013.01); *B41J 3/4075* (2013.01); *B41J 2002/14258* (2013.01); *C09D 11/322* (2013.01)

(58) Field of Classification Search
None
See application file for complete search history.

(56) References Cited

U.S. PATENT DOCUMENTS

2010/0265292 A1    10/2010    Ohshima et al.

FOREIGN PATENT DOCUMENTS

| EP | 0 822 094 A2 | 2/1998 |
| EP | 2 277 630 A2 | 1/2011 |

(Continued)

OTHER PUBLICATIONS

IP.com search.*
Official Communication issued in International Patent Application No. PCT/EP2015/074537, dated Dec. 21, 2015.

*Primary Examiner* — Lisa M Solomon
(74) *Attorney, Agent, or Firm* — Keating and Bennett, LLP (57) ABSTRACT

A manufacturing method of decorative laminates includes the steps of: a) printing an ink acceptance layer by jetting droplets having a volume of 1 to 200 nL onto a paper substrate; b) forming a decorative layer by jetting ink droplets having a volume of up to 30 pL of one or more aqueous pigmented inkjet inks onto the dried ink acceptance layer; and c) heat pressing the decorative layer into a decorative laminate; wherein the ink acceptance layer contains an inorganic pigment P and a polymeric binder B in a weight ratio P/B larger than 1.5.

11 Claims, 1 Drawing Sheet

(51) Int. Cl.
    *B41M 5/00*         (2006.01)
    *B41J 3/407*      (2006.01)
    *D06P 5/30*        (2006.01)
    C09D 11/322    (2014.01)
    B41J 2/14       (2006.01)

(56) References Cited

FOREIGN PATENT DOCUMENTS

| EP | 2 431 190 A2 | 3/2012 |
| EP | 2 505 620 A1 | 10/2012 |
| WO | 2013/141706 A1 | 9/2013 |

\* cited by examiner

Prior Art

MANUFACTURING METHODS OF DECORATIVE LAMINATES BY INKJET

CROSS REFERENCE TO RELATED APPLICATIONS

This application is a 371 National Stage Application of PCT/EP2015/074537, filed Oct. 22, 2015. This application claims the benefit of European Application No. 14191197.4, filed Oct. 31, 2014, which is incorporated by reference herein in its entirety.

BACKGROUND OF THE INVENTION

1. Field of the Invention

The present invention relates to the manufacturing of decorative laminates using inkjet technology.

2. Description of the Related Art

Gravure, offset and flexography are being increasingly replaced for different applications by industrial inkjet printing systems, which have now proven their flexibility in use, such as variable data printing making short production runs and personalized products possible, and their enhanced reliability, allowing incorporation into production lines.

Figure 1:
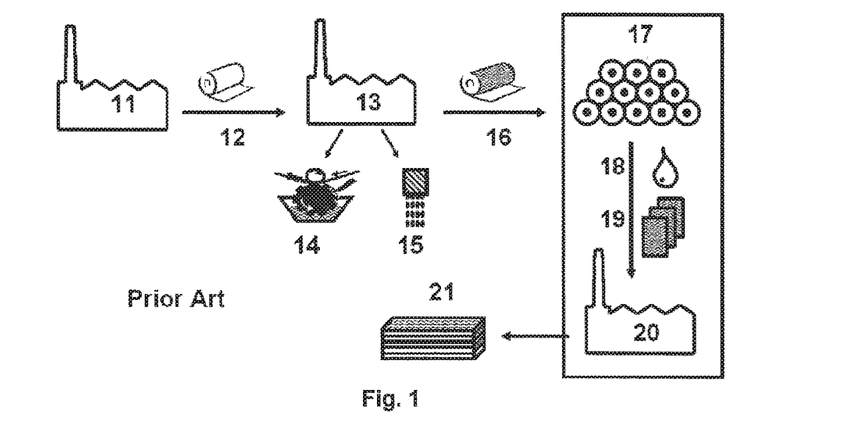
FIG. 1 shows the prior art production process for manufacturing decorative panels, wherein a paper manufacturer (11) supplies a paper roll (12) to a decor printer (13) using gravure printing (14) or inkjet printing (15) in order to deliver a decor paper roll (16) to a warehouse (17) of a floor laminate manufacturer (20). Depending on the market demand, the floor laminate manufacturer (20) selects one of the different decor rolls in his warehouse (17) to impregnate (18) and to cut to a size (19) for being heat pressed and finished into ready-to-use floor laminate (21).

Inkjet technology has also caught the attention of manufacturers of decorative surfaces, such as laminate floor. In the state-of-the-art production process for manufacturing decorative panels as shown by FIG. 1, a paper manufacturer (11) supplies a paper roll (12) to a decor printer (13) who uses gravure printing (14) in order to deliver a decor paper roll (16) to a warehouse (17) of a floor laminate manufacturer (20). Some decor printers (13) are now investigating inkjet printing (15) instead of gravure printing. Rotogravure printing on the porous decor paper generally uses ink having a viscosity at 25° C. of 1 to 2 Pa·s, while the viscosity of inkjet inks is much lower, often up to 15 mPa·s at 25° C. The floor laminate manufacturer (20) stores the decor paper rolls (16) having different decorative patterns in his warehouse (17). Depending on the market demand, the floor laminate manufacturer (20) then selects the decor rolls (16) with the desired decorative pattern in his warehouse (17). The selected decor rolls (16) are then impregnated (18) and cut to size (19) for manufacturing ready-to-use floor laminate (21). The warehouse (17) is necessary as a buffer for sudden large market demands of a specific floor laminate because there is a large time delay between ordering and delivering of new decorative paper rolls (16).

An approach to reduce the size of the warehouse and time delays is treated by EP 2431190 A (THEODOR HYMMEN), which discloses in FIG. 1 a method for producing a digitally printed sheet, web or plate-shaped workpiece (20) with wear-resistant surface including the steps of: A) providing a digital data set to a digital printing device (1); B) providing a printable workpiece (20) to the printing apparatus (1); C) digital printing at least an acrylate printing ink (22) on the printable workpiece (20) using the printing apparatus (1) and thereafter supplying a resin mixture (5, 21) to the digitally printed workpiece; and D) curing the resin mixture (5, 21) by means of a heated press (7). The time delay can be avoided by the floor laminate manufacturer incorporating the manufacturing of decorative paper rolls into its own production process. Although acrylate based inks provide excellent image quality, on heat pressing into a decorative laminate adhesion problems are observed between the ink layer and the protective layer containing a thermosetting resin, such as melamine. The cause of these adhesion problems is that the water vapour produced during the polycondensation of the melamine cannot penetrate through the polymerized acrylate ink layer. Paragraph discloses that the adhesion problems are especially seen at high ink coverages of more than 10 g/m² (e.g. a dark wood laminate).

Aqueous inkjet inks have been used for manufacturing decorative laminates by single pass inkjet printing. For example, in the Palis roll-to-roll single pass printing systems (http://www.palis-digital.com/en/portfolio/sp-drucker.html) aqueous inkjet inks are printed on a paper substrate having a special ink acceptance layer. Printed decorative paper rolls are then delivered to the floor laminate manufacturer, who then impregnates the printed decorative paper with a thermosetting resin before cutting into sheets. Dark wood laminate could be manufactured exhibiting no adhesion problems.

In manufacturing decorative laminate having a wood decorative pattern, often a wood grain is embossed into the decorative laminate during heat pressing. It has been observed that it is very difficult to align the wood grain with the wood decorative pattern due to the dimensional instability of the decor paper by impregnation with thermosetting resin after printing.

EP 2277630 A (VITS) discloses a coating device integrated into an impregnation line that uses a roller pair (3) comprising drivable rollers (3a, 3b) forming an adjustable metering opening for coating a liquid containing abrasion-resistant particles onto an impregnated paper. While the coating quality suffices for applying abrasion-resistant particles, it was found that for the application of an ink acceptance layer the coating quality was too inhomogeneous and caused image artifacts, especially near the ends of the rollers.

Hence, there is still a need for improved manufacturing methods of decorative surfaces using inkjet technology and melamine resin as a wear coating exhibiting good image quality, adhesion and wherein an embossed wood grain corresponds with a decorative pattern.

SUMMARY OF THE INVENTION

In order to overcome the problems described above, preferred embodiments of the present invention have been realised with a method for manufacturing decorative laminates as defined below.

It was found that excellent image quality and adhesion was obtained by jetting one or more aqueous pigmented inkjet ink on an ink acceptance layer containing an inorganic pigment P and a polymeric binder B in a specific ratio P/B. The ink acceptance layer was present on a fully impregnated base paper. An advantage of first impregnating and then inkjet printing is the dimensional stability of the inkjet printed paper, allowing for a wood grain to be embossed in perfect alignment with the inkjet printed wood colour pattern.

Figure 2:
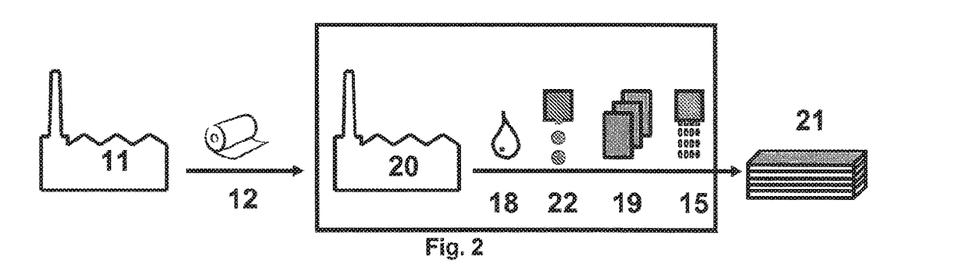
FIG. 2 shows a production process for manufacturing decorative panels, wherein a paper manufacturer (11) supplies a paper roll (12) directly to a floor laminate manufacturer (20) who impregnates (18) the paper roll (12), prints an ink acceptance layer (22) on the paper, cuts to a size (19) for being inkjet printed (15) and then heat pressed and finished into ready-to-use floor laminate (21). The order of cutting to size (19) and inkjet printing (15) may also be reversed, i.e. printing on a impregnated paper roll before cutting to sheets.

Another major advantageous effect of the invention is the much simpler manufacturing process of decorative laminates, which is immediately visible by comparing FIG. 1 and FIG. 2 showing that our invention requires no longer an intermediate decor printer company (13) or a warehouse (17). Printing in-house at the floor laminate manufacturer (20) allows for maximum flexibility. Changes in design of a decorative colour pattern can be rapidly introduced in production, thereby also minimizing dependency on supply by the decor printer company (13). There are also no longer minimum purchase quantities to be negotiated with the decor printer company (13). In-house printing allows for fast adaptability to market trends and an increase of product variety without substantial financial penalties.

The replacement of gravure by inkjet also has many advantages. There is no longer a storage of expensive gravure rolls necessary. Furthermore, inkjet allows easy colour reproduction compared to the time consuming colour matching issues in gravure which usually may take up to 5 hours of tuning. This immediately also illustrates that short print runs using inkjet is much more cost-efficient than gravure.

Resin impregnation can cause major paper loss. Financial loss is minimized if the paper is first impregnated and then inkjet printed, because less digital print has to be thrown away. A dried impregnated paper becomes also brittle and is therefore best stored in sheet form, rather than as a paper roll.

Further advantages and preferred embodiments of the present invention will become apparent from the following description.

DETAILED DESCRIPTION OF THE PREFERRED EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —$NO_2$.

Manufacturing Methods of Decorative Laminates

A manufacturing method of decorative laminates according to the present invention includes the steps of: a) printing an ink acceptance layer by jetting droplets having a volume of 1 to 200 nL onto a paper substrate; b) forming a decorative layer by jetting ink droplets having a volume of up to 30 pL of one or more aqueous pigmented inkjet inks onto the dried ink acceptance layer; and c) heat pressing the decorative layer into a decorative laminate; wherein the ink acceptance layer contains an inorganic pigment P and a polymeric binder B in a weight ratio P/B larger than 1.5.

In a preferred embodiment of the manufacturing method, the paper substrate is first impregnated by a thermosetting resin and then an ink acceptance layer is printed onto the impregnated paper substrate. The advantage thereof is that a perfect match between decorative pattern and an embossed wood grain can be easily achieved, because the impregnated paper substrate is dimensionally stable. The embossing of a relief into the decorative laminate is preferably combined with step c) of heat pressing the decorative layer into a decorative laminate.

In a preferred embodiment of the manufacturing method, the droplets forming the ink acceptance layer are jetted by a valve jet print head, a piezoneedle print head or a through flow piezoelectric print head, more preferably the droplets forming the ink acceptance layer are jetted by a through flow piezoelectric print head. The latter allows preventing sedimentation of the inorganic pigment in the print head, especially during a stand-still of the inkjet printing device, by continuous recirculation of the liquid through the print head.

In a preferred embodiment of the manufacturing method, the ink acceptance layer is printed in a single pass inkjet printing mode. A page wide print head can be used for such a print mode, but preferably multiple staggered print heads for jetting the droplets forming the ink acceptance layer are used to cover 90% to 100% of the width of the paper roll.

In a preferred embodiment of the manufacturing method, the jetting of the one or more aqueous pigmented inkjet inks is performed in a single pass inkjet printing mode.

In one preferred embodiment, the one or more print heads for jetting droplets having a volume of 1 to 200 nL and the one or more print heads for jetting ink droplets having a volume of up to 30 pL are integrated in a single inkjet printing device, preferably a flat bed inkjet printer capable of receiving large paper sheets.

In another preferred embodiment, the one or more print heads for jetting droplets having a volume of 1 to 200 nL and the one or more print heads for jetting ink droplets having a volume of up to 30 pL are integrated at different locations of the manufacturing line of decorative laminates. In a preferred embodiment, the one or more print heads for jetting droplets having a volume of 1 to 200 nL are positioned at the end of the impregnation line, preferably after the impregnated paper substrate was first dried. The impregnated paper substrate having an ink acceptance layer is then cut into paper sheets, which may be stored if desired in order to have a buffer in the manufacturing line. The one or more print heads for jetting ink droplets having a volume of up to 30 pL are then preferably positioned in a printing device just prior to the loading of the decorative layer into the heat press. The advantage is that last minute changes in the colour pattern of the decorative layer can then be handled, for example, to produce decorative layers for an urgent order of a short-run batch of decorative laminates. This printing device containing one or more print heads for jetting ink droplets having a volume of up to 30 pL may consist of one single pass inkjet printing device or of a plurality of multipass inkjet printing devices. In a multipass inkjet printing device, the print heads move more than once over the same print area. The advantage is that image artifacts due to e.g. a failing nozzle can then be minimized, resulting in minimal production losses of decorative laminates.

In a preferred embodiment of the manufacturing method, the one or more aqueous pigmented inkjet inks include at least three aqueous pigmented inkjet inks containing one or more pigments selected from the group consisting of carbon black, C.I. Pigment Blue 15:3, C.I. Pigment Blue 15:4, C.I Pigment Yellow 150, C.I Pigment Yellow 151, C.I. Pigment Yellow 180, C.I. Pigment Yellow 74, C.I Pigment Red 254, C.I. Pigment Red 176, C.I. Pigment Red 122, and mixed crystals thereof.

Inkjet Printing Devices

The liquid for printing the ink acceptance layer and the aqueous pigmented inkjet inks are jetted by print heads ejecting small droplets in a controlled manner through nozzles onto a substrate, which is moving relative to the print head(s).

The liquid for printing the ink acceptance layer is jetted by one or more print heads for jetting droplets having a volume of 1 to 200 nL. The aqueous pigmented inkjet inks are jetted by one or more print heads for jetting droplets having a volume of up to 30 pL. Droplets having a volume smaller than 1 nL for printing the ink acceptance layer tend to reduce the manufacturing speed of the decorative laminates too much, while ink droplets larger than 30 pL tend to reduce the image quality and thus the appeal of decorative laminates.

In a preferred embodiment, an inkjet printing device for manufacturing decorative laminates according to the present invention includes both the one or more print heads for jetting droplets having a volume of 1 to 200 nL and the one or more print heads for jetting droplets having a volume of up to 30 pL.

In an alternative preferred embodiment, the one or more print heads for jetting droplets having a volume of 1 to 200 nL and the one or more print heads for jetting droplets having a volume of up to 30 pL are positioned at different locations of the production line for manufacturing decorative laminates.

The one or more print heads for jetting droplets having a volume of 1 to 200 nL are preferably selected from the group consisting of a valve jet print head, a piezoneedle print head and a through flow print head, more preferably the print head for jetting droplets having a volume of 1 to 200 nL is a through flow piezoelectric print head.

The one or more print heads for jetting ink droplets having a volume of up to 30 pL are preferably throughflow inkjet printheads, more preferably through flow piezoelectric inkjet print heads.

Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head.

A suitable piezoelectric print head for jetting droplets having a volume of 1 to 200 nL is the through flow piezoelectric print head Xaar™ 001 of XAAR, which jets droplets having a volume of up to 200 nL typically at a viscosity between 5 and 35 mPa·s.

Another preferred print head for jetting droplets having a volume of 1 to 200 nL is a so-called valvejet printhead. A valvejet printhead is also called coil package or micro valves or a dispensing module of micro valves. The droplet forming means in a valvejet printhead controls a micro valve in the valvejet print head by actuating electromagnetically to close or to open the micro valve so that the liquid flows through the liquid channel. Valvejet printheads preferably have a maximum dispensing frequency up to 3000 Hz. The way to incorporate valvejet printheads into an inkjet printing device is well-known to the skilled person. For example, US 2012105522 (MATTHEWS RESOURCES) discloses a valvejet printer including a solenoid coil and a plunger rod having a magnetically susceptible shank. Suitable commercial valvejet print heads are HSV400 and HSV800 all from ZIMMER, Printos™ P16 from VideoJet and the coil packages of micro valve SMLD 300's from FRITZ GYGER™. A nozzle plate of a valvejet print head is often called a faceplate and is preferably made from stainless steel.

A piezoneedle print head is also suitable for jetting droplets having a volume of 1 to 200 nL onto a paper substrate. Such print heads have been used, for example, in a digital textile printer by ZIMMER at ITMA2003, where the technology was called FlatJet™ technology. The functioning of a piezoneedle print head is described e.g. in U.S. Pat. No. 6,460,980.

The one or more print heads for jetting ink droplets having a volume of up to 30 pL are preferably through flow print heads, more preferably through flow piezoelectric print heads. However also another type of inkjet print head be used, such as a continuous type print head and a thermal print head.

Suitable commercial piezoelectric print heads for jetting ink droplets having a volume of up to 30 pL are a KJ4B print head from KYOCERA and a MHS420 print head (Gen5) from RICOH. Suitable are also print heads, such as those from MEMJET ejecting droplets by silicium paddles moving up and down due to a bi-metal effect.

In a multipass inkjet printing device, the inkjet print head normally scans back and forth in a transversal direction across the moving ink-acceptance layer. Often the inkjet print head does not print on the way back, but bi-directional printing is preferred for obtaining a high area throughput.

Another preferred printing method is by a "single pass printing process", which can be performed by using page wide inkjet print heads or multiple staggered inkjet print heads which cover (almost) the entire width of the ink-acceptance layer. In a single pass printing process the inkjet print heads usually remain stationary and the substrate surface is transported once under the inkjet print heads.

Techniques to dry the liquid for the ink acceptance layer and the aqueous pigmented inkjet inks are well-known to persons skilled in the art of inkjet printing devices and may involve both heat convection and heat conduction. In a preferred embodiment, use is made of infrared light coming from an infrared light source, more preferably a near infrared light source, such as NIR LEDs which have the advantage of being compact, energy-saving infrared dryers. Also combination between e.g. NIR LEDs and the printed paper substrate being blown off with warm air.

Decorative Layers

The decorative layer includes a thermosetting resin impregnated paper, an ink acceptance layer containing an inorganic pigment P and a polymeric binder B having a weight ratio of inorganic pigment to polymeric binder (P/B ratio) of larger than 1.5, and a colour pattern inkjet printed thereon by one or more print heads for jetting ink droplets having a volume of up to 30 pL.

In a preferred embodiment, the ink acceptance layer containing an inorganic pigment and a polymeric binder has a weight ratio P/B of inorganic pigment to binder of larger than 3.0, preferably 3.5 or more.

Before printing a colour pattern, or at least a portion thereof, the paper has preferably been provided with resin. This measure improves the stability of the paper. In such cases at least a portion of the expansion or shrinkage due to the resin provision takes place before inkjet printing the aqueous pigmented inkjet inks. The resin provided paper is preferably dried before applying an ink acceptance layer and before inkjet printing, preferably to a residual humidity of 10% or less. In this case the most important portion of the expansion or shrinkage of the paper layer is neutralized. The advantage of having this dimensional stability is especially observed in the cases where, like in EP 1290290 A (FLOORING IND), a correspondence between the relief and the printed decor is desired. Another advantage of drying the thermosetting resin provided paper before applying the ink acceptance layer is that no or substantially no thermosetting resin is present in the ink acceptance layer. The presence of thermosetting resin in the ink acceptance layer tends to deteriorate the ink bleeding of the inkjet printed image.

A decorative panel, like a floor panel, usually has on one side of the core layer a decorative layer and a balancing layer on the other side of the core layer. However, a decorative layer may be applied on both sides of the core layer. The latter is especially desirable in the case of laminate panels for furniture. In such a case, a protective layer may be applied on both decorative layers present on both sides of the core layer.

Decorative Laminates

The decorative laminates are semi-rigid or rigid panels, preferably rigid panels. In a preferred embodiment the decorative laminates are selected from the group consisting of kitchen panels, flooring panels, furniture panels, ceiling panels and wall panels.

A preferred decorative laminate contains the inkjet printed thermosetting resin impregnated paper as described above having an ink acceptance layer with a P/B ratio of larger than 1.5 heat pressed with a core layer and a protective layer, wherein the decorative laminate is selected from the group consisting of flooring, kitchen, furniture and wall panels. In a more preferred embodiment, the decorative laminate includes a tongue and a groove capable of achieving a glue less mechanical joint.

Figure 3:
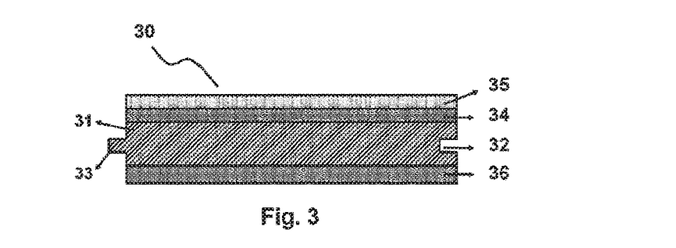
FIG. 3 shows a cross-section of a decorative panel (30) including a core layer (31) with a groove (32) and tongue (33) which is laminated on the top side by a decorative layer (34) and a protective layer (35) and on the back side by a balancing layer (36).

A decorative panel (30), illustrated by a flooring panel having also a tongue and groove joint (33, 32) in FIG. 3, includes preferably at least a core layer (31) and a decorative layer (34). In order to protect the colour pattern of the decorative layer (34) against wear, a protective layer (35) may be applied on top of the decorative layer (34). A balancing layer (36) may also be applied at the opposite side of the core layer (31) to restrict or prevent possible bending of the decorative panel (30). The assembly into a decorative panel of the balancing layer, the core layer, the decorative layer, and preferably also a protective layer, is preferably performed in the same press treatment of preferably a DPL process (Direct Pressure Laminate).

In a preferred embodiment of decorative panels, tongue and groove profiles (33 respectively 32 in FIG. 3) are milled into the side of individual decorative panels which allow them to be slid into one another. The tongue and grove joint ensures, in the case of flooring panels, a sturdy floor construction and protects the floor, preventing dampness from penetrating.

Figure 4:
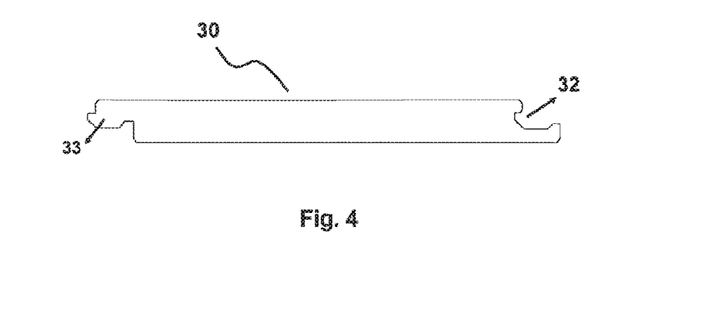
FIG. 4 shows a cross section of a decorative panel (30) having a tongue (33) and a groove (32) for a mechanical joint which requires no glue.

In a more preferred embodiment, the decorative panels include a tongue and a groove of a special shape (e.g. 33 respectively 32 in FIG. 4) which allow them to be clicked into one another. The advantage thereof is an easy assembly requiring no glue. The shape of the tongue and groove necessary for obtaining a good mechanical joint is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

The decorative laminates, especially decorative panels, may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative laminates as exemplified by EP 1567334 A (FLOORING IND).

The top surface of the decorative laminate, i.e. at least the protective layer, is preferably provided with a relief matching the colour pattern, such as for example the wood grain, cracks and knots in a woodprint. Embossing techniques to accomplish such relief are well-known and disclosed by, for example, EP 1290290 A (FLOORING IND), US 2006144004 (UNILIN), EP 1711353 A (FLOORING IND) and US 2010192793 (FLOORING IND).

Most preferably the relief is formed by pressing a digital embossing plate against the top layer of the decorative workpiece or nested decorative workpiece.

A digital embossing plate is a plate which comprises elevations that can be used to form a relief on decorative workpiece by pressing the digital embossing plate against the top layer of the decorative workpiece or nested decorative workpiece. The elevations are cured inkjet droplets, jetted by an inkjet print device, and most preferably UV cured inkjet droplets. The elevations are preferably formed by printing and curing inkjet droplets on top of already cured or pin-cured inkjet droplets. The plate is preferably stiff by using metal or hard plastic.

An alternative of a digital embossing plate may be a digital embossing cylinder which is a cylinder that comprises the elevations to form a relief on decorative workpieces by pressing and rotating the digital embossing cylinder against the top layer of the decorative workpiece or nested decorative workpiece. The elevations on the digital embossing cylinder are cured inkjet droplets, jetted by an inkjet print device, and most preferably UV cured inkjet droplets. The elevations are preferably formed by printing and curing inkjet droplets on top of already cured or pin-cured inkjet droplets.

In a preferred embodiment, the decorative panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special preferred embodiment the length of the panels exceeds 2 meter, with the width being preferably about 0.2 meter or more. The print of such panels is preferably free from repetitions.

Core Layers

The core layer is preferably made of wood-based materials, such as particle board, MDF or HDF (Medium Density Fibreboard or High Density Fibreboard), Oriented Strand Board (OSB) or the like. Also, use can be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, e.g. as described in U.S. Pat. No. 4,952,277 (BET PAPERCHEM).

In another preferred embodiment, the core layer is a board material composed substantially of wood fibres which are bonded by means of a polycondensation glue, wherein the polycondensation glue forms 5 to 20 percent by weight of the board material and the wood fibres are obtained for at least 40 percent by weight from recycled wood. Suitable examples are disclosed by EP 2374588 A (UNILIN).

Instead of a wood based core layer, also a synthetic core layer may be used, such as those disclosed by US 2013062006 (FLOORING IND). In a preferred embodiment, the core layer comprises a foamed synthetic material, such as foamed polyethylene or foamed polyvinyl chloride.

Other preferred core layers and their manufacturing are disclosed by US 2011311806 (UNILIN) and U.S. Pat. No. 6,773,799 (DECORATIVE SURFACES).

The thickness of the core layer is preferably between 2 and 12 mm, more preferably between 5 and 10 mm.

Paper Substrates

The decorative layer and preferably, if present also the protective layer and/or balancing layer, include paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 130 g/m$^2$ and preferably between 70 and 130 g/m$^2$. The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 25 seconds. Such porosity allows even for a heavy sheet of more than 150 g/m$^2$ to be readily impregnated with a relatively high amount of resin.

Suitable paper sheets having high porosity and their manufacturing are also disclosed by U.S. Pat. No. 6,709,764 (ARJO WIGGINS).

The paper for the decorative layer is preferably a white paper and may include one or more whitening agents, such as titanium dioxide, calcium carbonate and the like. The presence of a whitening agent helps to mask differences in colour on the core layer which can cause undesired colour effects on the colour pattern.

Alternatively, the paper for the decorative layer may be a bulk coloured paper including one or more colour dyes and/or colour pigments. Besides the masking of differences in colour on the core layer, the use of a coloured paper reduces the amount of inkjet ink required to print the colour pattern. For example, a light brown or grey paper may be used for printing a wood motif as colour pattern in order to reduce the amount of inkjet ink needed.

In a preferred embodiment, unbleached Kraft paper is used for a brownish coloured paper in the decorative layer. Kraft paper has a low lignin content resulting in a high tensile strength. A preferred type of Kraft paper is absorbent Kraft paper of 40 to 135 g/m$^2$ having a high porosity and made from clean low kappa hardwood Kraft of good uniformity.

If the protective layer includes a paper, then a paper is used which becomes transparent or translucent after resin impregnation so that for the colour pattern in the decorative layer can be viewed.

The above papers may also be used in the balancing layer.

For the sake of clarity, it should be clear that resin coated papers, so-called RC papers, are not the thermosetting resin impregnated papers of the decorative laminate manufacturing methods according to the invention. The RC papers used in home/office aqueous inkjet printing consist of a porous paper core free of resin. The RC papers have only on their surface a resin coating, usually a polyethylene or polypropylene resin coating, with thereon one or more ink receiving layers. Such RC papers have a low permeability for the thermosetting resin leading to inhomogeneous resin absorption and higher risk for delamination after pressing.

Thermosetting Resins

The thermosetting resin is preferably selected from the group consisting of melamine-formaldehyde based resins, ureum-formaldehyde based resins and phenol-formaldehyde based resins. Other suitable resins for impregnating the paper are listed in of EP 2274485 A (HUELSTA).

Most preferably the thermosetting resin is a melamine-formaldehyde based resin, often simply referred to in the art as a 'melamine (based) resin'.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer before being trapped and leading to a loss of transparency in the hardened layer. The available ink layer can hinder the diffusion of the vapour bubbles to the surface, however the present invention provides measures for limiting such hindrance.

The paper is preferably provided with an amount of thermosetting resin equalling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

The paper is preferably provided with such an amount of thermosetting resin, that at least the paper core is satisfied with the resin. Such satisfaction can be reached when an amount of resin is provided that corresponds to at least 1.5 or at least 2 times the paper weight. Preferably the paper is firstly impregnated through or satisfied, and, afterwards, at least at the side thereof to be printed, resin is partially removed.

Preferably the resin provided on said paper is in a B-stage while printing. Such B-stage exists when the thermosetting resin is not completely cross linked.

Preferably the resin provided on said paper has a relative humidity lower than 15%, and still better of 10% by weight or lower while printing.

Preferably the step of providing said paper with thermosetting resin involves applying a mixture of water and the resin on the paper. The application of the mixture might involve immersion of the paper in a bath of the mixture. Preferably the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS) and EP 966641 A (VITS).

The dry resin content of the mixture of water and resin for impregnation depends on the type of resin. An aqueous solution containing a phenol-formaldehyde resin preferably has a dry resin content of about 30% by weight, while an aqueous solution containing a melamine-formaldehyde resin preferably has a dry resin content of about 60% by weight. Methods of impregnation with such solutions are disclosed by e.g. U.S. Pat. No. 6,773,799 (DECORATIVE SURFACES).

The paper is preferably impregnated with the mixtures known from U.S. Pat. No. 4,109,043 (FORMICA CORP) and U.S. Pat. No. 4,112,169 (FORMICA CORP), and hence preferably comprise, next to melamine formaldehyde resin, also polyurethane resin and/or acrylic resin.

The mixture including the thermosetting resin may further include additives, such as colorants, surface active ingredients, biocides, antistatic agents, hard particles for wear resistance, elastomers, UV absorbers, organic solvents, acids, bases, and the like.

The advantage of adding a colorant to the mixture containing the thermosetting resin is that a single type of white paper can be used for manufacturing the decorative layer, thereby reducing the stock of paper for the decorative laminate manufacturer. The use of a colored paper, as already described above, to reduce the amount of ink required for printing a wood motif, is here accomplished by the white paper being colored by impregnation by a brownish thermosetting resin. The latter allows a better control of the amount of brown colour required for certain wood motifs.

Antistatic agents may be used in thermosetting resin. However preferably antistatic agents, like NaCl and KCl, carbon particles and metal particles, are absent in the resin, because often they have undesired side effects such as a lower water resistance or a lower transparency. Other suitable antistatic agents are disclosed by EP 1567334 A (FLOORING IND).

Hard particles for wear resistance are preferably included in a protective layer.

Ink Acceptance Layers

The ink acceptance layer contains an inorganic pigment and a polymeric binder having a weight ratio P/B of inorganic pigment P to polymeric binder B of larger than 1.5, preferably larger than 3.0. The inorganic pigment may be a single type of inorganic pigment or a plurality of different inorganic pigments. The polymeric binder may be a single type of polymeric binder or a plurality of different polymeric binders.

In a preferred embodiment, the ink acceptance layer has a total dry weight between 2.0 g/m$^2$ and 10.0 g/m$^2$, more preferably between 3.0 and 6.0 g/m$^2$.

The thickness of the ink acceptance layer may vary over the width of the paper substrate, for example, to compensate for inhomogeneities in the surface of the impregnated paper substrate causing image artifacts or to apply image wise more inorganic pigment. The latter may, for example, become necessary in dark brown areas of wood grain requiring high ink loads of aqueous pigmented inkjet ink. The variation of the thickness of the ink acceptance layer over the width of the paper substrate is preferably at least 10%, more preferably at least 20% of the thickness. A thickness difference of less than 10% generally has little effect in improving image quality.

In a preferred embodiment, the ink acceptance layer includes a polymeric binder selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar.

In a particularly preferred embodiment, the ink acceptance layer includes a polymeric binder, preferably a water soluble polymeric binder (>1 g/L water), which has a hydroxyl group as a hydrophilic structural unit, e.g. a polyvinyl alcohol.

A preferred polymer for the ink acceptance layer is a polyvinylalcohol (PVA), a vinylalcohol copolymer or modified polyvinyl alcohol. The modified polyvinyl alcohol may be a cationic type polyvinyl alcohol, such as the cationic polyvinyl alcohol grades from Kuraray, such as POVAL C506, POVAL C118 from Nippon Goshei.

The pigment in the ink acceptance layer is an inorganic pigment, which can be chosen from neutral, anionic and cationic pigment types. Useful pigments include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides.

The inorganic pigment is preferably selected from the group consisting of alumina hydrates, aluminum oxides, aluminum hydroxides, aluminum silicates, and silicas.

Particularly preferred inorganic pigments are silica particles, colloidal silica, alumina particles and pseudo-boehmite, as they form better porous structures. When used herein, the particles may be primary particles directly used as they are, or they may form secondary particles. Preferably, the particles have an average primary particle diameter of 2 μm or less, and more preferably 200 nm or less.

A preferred type of alumina hydrate is crystalline boehmite, or γ-AlO(OH). Useful types of boehmite include DISPERAL HP14, DISPERAL 40, DISPAL 23N4-20, DISPAL 14N-25 and DISPERAL AL25 from Sasol; and MARTOXIN VPP2000-2 and GL-3 from Martinswerk GmbH.

Useful cationic aluminum oxide (alumina) types include $\alpha Al_2O_3$ types, such as NORTON E700, available from Saint-Gobain Ceramics & Plastics, Inc, and $\gamma$-$Al_2O_3$ types, such as ALUMINUM OXID C from Degussa.

Other useful inorganic pigments include aluminum trihydroxides such as Bayerite, or $\alpha$-$Al(OH)_3$, such as PLURAL BT, available from Sasol, and Gibbsite, or $\gamma$-$Al(OH)_3$, such as MARTINAL grades and MARTIFIN grades from Martinswerk GmbH, MICRAL grades from JM Huber company; HIGILITE grades from Showa Denka K.K.

Another preferred type of inorganic pigment is silica which can be used as such, in its anionic form or after cationic modification. The silica can be chosen from different types, such as crystalline silica, amorphous silica, precipitated silica, fumed silica, silica gel, spherical and non-spherical silica. The silica may contain minor amounts of metal oxides from the group Al, Zr, Ti. Useful types include AEROSIL OX50 (BET surface area 50±15 $m^2$/g, average primary particle size 40 nm, $SiO_2$ content >99.8%, $Al_2O_3$ content <0.08%), AEROSIL MOX170 (BET surface area 170 g/$m^2$, average primary particle size 15 nm, $SiO_2$ content >98.3%, $Al_2O_3$ content 0.3-1.3%), AEROSIL MOX80 (BET surface area 80±20 g/$m^2$, average primary particle size 30 nm, $SiO_2$ content >98.3%, $Al_2O_3$ content 0.3-1.3%), or other hydrophilic AEROSIL grades available from Degussa-Huls AG, which may give aqueous dispersions with a small average particle size (<500 nm).

Generally depending on their production method, silica particles are grouped into two types, wet-process particles and dry-process (vapour phase-process or fumed) particles.

In the wet process, active silica is formed through acidolysis of silicates, and this is polymerized to a suitable degree and flocculated to obtain hydrous silica.

A vapour-phase process includes two types; one includes high-temperature vapour-phase hydrolysis of silicon halide to obtain anhydrous silica (flame hydrolysis), and the other includes thermal reduction vaporization of silica sand and coke in an electric furnace followed by oxidizing it in air to also obtain anhydrous silica (arc process). The "fumed silica" means to indicate anhydrous silica particles obtained in the vapour-phase process.

For the silica particles used in the invention, especially preferred are the fumed silica particles. The fumed silica differs from hydrous silica in point of the density of the surface silanol group and of the presence or absence of pores therein, and the two different types of silica have different properties. The fumed silica is suitable for forming a three-dimensional structure of high porosity. Since the fumed silica has a particularly large specific surface area, its ink absorption and retention are high. Preferably, the vapour-phase silica has an average primary particle diameter of 30 nm or less, more preferably 20 nm or less, even more preferably 10 nm or less, and most preferably from 3 to 10 nm. The fumed silica particles readily aggregate through hydrogen bonding at the silanol groups therein. Therefore, when their mean primary particle size is not larger than 30 nm, the silica particles may form a structure of high porosity.

In a further preferred embodiment, the ink acceptance layer may be crosslinked. Any suitable crosslinker known in the prior art can be used. Boric acid is particularly preferred as crosslinker for an ink acceptance layer containing polyvinylalcohol or vinylalcohol copolymer as polymeric binder.

The ink acceptance layer may include other additives, such as colorants, surfactants, biocides, antistatic agents, hard particles for wear resistance, elastomers, UV absorbers, organic solvents, plasticizers, light-stabilizers, pH adjusters, antistatic agents, whitening agents, matting agents and the like.

The ink acceptance layer may consist of a single layer or of two, three or more layers even having a different composition.

Colour Patterns

The colour pattern is obtained by jetting the pigmented inkjet inks on the ink acceptance layer.

There is no real restriction on the content of the colour pattern. The colour pattern may also contain information such as text, arrows, logo's and the like. The advantage of inkjet printing is that such information can be printed at low volume without extra cost, contrary to gravure printing.

In a preferred embodiment, the colour pattern is a wood reproduction or a stone reproduction, but it may also be a fantasy or creative pattern, such as an ancient world map or a geometrical pattern, or even a single colour for making, for example, a floor consisting of black and red tiles or a single colour furniture door.

An advantage of printing a wood colour pattern is that a floor can be manufactured imitating besides oak, pine and beech, also very expensive wood like black walnut which would normally not be available for house decoration.

An advantage of printing a stone colour pattern is that a floor can be manufactured which is an exact imitation of a stone floor, but without the cold feeling when walking barefooted on it and that it is easy replaceable over time according to fashion.

Protective Layers

Preferably a protective layer is applied above the colour pattern, e.g. by way of an overlay, i.e. a resin provided carrier, or a liquid coating, preferably while the decor layer is laying on the substrate, either loosely or already connected or adhered thereto.

In a preferred embodiment, the carrier of the overlay is a paper impregnated by a thermosetting resin that becomes transparent or translucent after heat pressing in a DPL process.

A preferred method for manufacturing such an overlay is described in US 2009208646 (DEKOR KUNSTSTOFFE).

The liquid coating includes preferably a thermosetting resin, but may also be another type of liquid such as a UV- or an EB-curable varnish.

In a particularly preferred embodiment, the liquid coating includes a melamine resin and hard particles, like corundum.

The protective layer is preferably the outermost layer, but in another preferred embodiment a thermoplastic or elastomeric surface layer may be coated on the protective layer, preferably of pure thermoplastic or elastomeric material. In the latter case, preferably a thermoplastic or elastomeric material based layer is also applied on the other side of the core layer.

Liquid melamine coatings are exemplified in DE 19725829 C (LS INDUSTRIELACKE) and U.S. Pat. No. 3,173,804 (RENKL PAIDIWERK).

The liquid coating may contain hard particles, preferably transparent hard particles. Suitable liquid coatings for wear protection containing hard particles and methods for manufacturing such a protective layer are disclosed by US 2011300372 (CT FOR ABRASIVES AND REFRACTORIES) and U.S. Pat. No. 8,410,209 (CT FOR ABRASIVES AND REFRACTORIES).

The transparency and also the colour of the protective layer can be controlled by the hard particles, when they comprise one or a plurality of oxides, oxide nitrides or mixed oxides from the group of elements Li, Na, K, Ca, Mg, Ba, Sr, Zn, Al, Si, Ti, Nb, La, Y, Ce or B.

The total quantity of hard particles and transparent solid material particles is typically between 5% by volume and 70% by volume, based on the total volume of the liquid coating. The total quantity of hard particles is between 1 $g/m^2$ and 100 $g/m^2$, preferably 2 $g/m^2$ to 50 $g/m^2$.

If the protective layer includes a paper as carrier sheet for the thermosetting resin, then the hard particles, such as aluminium oxide particles, are preferably incorporated in or on the paper. Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

In an alternative preferred embodiment of a protective layer including a paper as carrier sheet for the thermosetting resin, the inkjet printing is performed on the thermosetting resin impregnated paper of the protective layer. The other paper substrate including a whitening agent, such as titanium dioxide, may then merely be used to mask surface defects of the core layer.

The amount of hard particles in the protective layer may determined in function of the desired wear resistance, preferably by a so-called Taber test as defined in EN 13329 and also disclosed in WO 2013/050910 A (UNILIN) and U.S. Pat. No. 8,410,209 (CT FOR ABRASIVES AND REFRACTOR).

Hard particles having an average particle size of between 1 and 200 μm are preferred. Preferably an amount of such particles of between 1 and 40 $g/m^2$ is applied above the printed pattern. An amount lower than 20 $g/m^2$ can suffice for the lower qualities.

If the protective layer includes a paper, then it preferably has a paper weight of between 10 and 50 $g/m^2$. Such a paper is often also referred to as a so-called overlay commonly used in laminate panels. Preferred methods for manufacturing such an overlay are disclosed by WO 2007/144718 (FLOORING IND).

Preferably the step of providing the protective layer of thermosetting resin above the printed pattern involves a press treatment. Preferably a temperature above 150° C. is applied in the press treatment, more preferably between 180° and 220° C., and a pressure of more than 20 bar, more preferably between 35 and 40 bar.

In another preferred embodiment, the decorative laminate is manufactured using two press treatments, because this results in an extremely high abrasion resistance. Indeed, during the first press treatment, preferably the layers immediately underlying the wear resistant protective layer are substantially or wholly cured. The hard particles comprised in the wear resistant protective layer are thereby prevented from being pushed down out of the top area of the floor panel into the colour pattern or below the colour pattern and stay in the zone where they are most effective, namely essentially above the colour pattern. This makes it possible to reach an initial wear point according to the Taber test as defined in EN 13329 of over 10000 rounds, where in one press treatment of layers with the same composition only just over 4000 rounds were reached. It is clear that the use of two press treatments as defined above, leads to a more effective use of available hard particles. An alternative advantage of using at least two press treatments lays in the fact that a similar wearing rate, as in the case where a single press treatment is used, can be obtained with less hard particles if the product is pressed twice. Lowering the amount of hard particles is interesting, since hard particles tend to lower the transparency of the wear resistant protective layer, which is undesirable. It becomes also possible to work with hard particles of smaller diameter, e.g. particles having an average particle diameter of 15 μm or less, or even of 5 μm or less.

Balancing Layers

The main purpose of the balancing layer(s) is to compensate tensile forces by layers on the opposite side of the core layer, so that an essentially flat decorative panel is obtained. Such a balancing layer is preferably a thermosetting resin layer that can comprise one or more carrier layers, such as paper sheets.

As already explained above for a furniture panel, the balancing layer(s) may be a decorative layer, optionally complemented by a protective layer.

Instead of one or more transparent balancing layers, also an opaque balancing layer may be used which gives the decorative panel a more appealing look by masking surface irregularities. Additionally, it may contain text or graphical information such as a company logo or text information.

Pigmented Inkjet Inks

The colour pattern is printed using one or more aqueous pigmented inkjet inks containing one or more colour pigments.

The liquid phase of the aqueous pigmented inkjet inks can be pure water, but preferably some organic solvents are present, such as a humectant. Suitable organic solvents are described below.

The pigmented aqueous inkjet ink preferably include at least one or more colour pigments and water, preferably completed with one or more dispersants if the colour pigment is not a self-dispersible colour pigment.

The inkjet inks are composed into an inkjet ink set having differently coloured inkjet inks. The inkjet ink set may be a standard CMYK ink set, but is preferably a CRYK ink set wherein the magenta (M) ink is replaced by red (R) inkjet ink. The use of a red inkjet ink enhances the colour gamut for wood based colour patterns, which represent the majority of decorative laminates in flooring.

The inkjet ink set may be extended with extra inks such as white, brown, red, green, blue, and/or orange to further enlarge the colour gamut of the image. The inkjet ink set may also be extended by the combination of the full density inkjet inks with light density inkjet inks. The combination of dark and light colour inks and/or black and grey inks improves the image quality by a lowered graininess. However preferably the inkjet ink set consists of no more than 3 or 4 inkjet inks, allowing the design of multi-pass inkjet printers of high throughput at acceptable cost.

Colour Pigments

The colorant of the inkjet inks preferably consists of one or more colour pigments. Colour pigments have much higher light stability than dyes. The pigmented inkjet ink preferably contains a dispersant, more preferably a polymeric dispersant, for dispersing the pigment. In addition to the polymeric dispersant, the pigmented inkjet ink may contain a dispersion synergist to further improve the dispersion quality and stability of the ink.

The aqueous pigmented inkjet ink may contain a so-called "self dispersible" colour pigment. A self-dispersible colour pigment requires no dispersant, because the pigment surface has ionic groups which realize electrostatic stabilization of the pigment dispersion. In case of self-dispersible colour pigments, the steric stabilization obtained by using a polymeric dispersant becomes optional. The preparation of self-dispersible colour pigments is well-known in the art and can be exemplified by EP 904327 A (CABOT).

The colour pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

A particularly preferred pigment for a cyan aqueous inkjet ink is a copper phthalocyanine pigment, more preferably C.I. Pigment Blue 15:3 or C.I. Pigment Blue 15:4.

Particularly preferred pigments for a red aqueous inkjet ink are C.I Pigment Red 254, C.I. Pigment Red 176 and C.I. Pigment Red 122, and mixed crystals thereof.

Particularly preferred pigments for yellow aqueous inkjet ink are C.I Pigment Yellow 151, C.I. Pigment Yellow 180 and C.I. Pigment Yellow 74, and mixed crystals thereof.

For the black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, a black inkjet ink may include a carbon black pigment and at least one pigment selected from the group consisting of a blue pigment, a cyan pigment, a magenta pigment and a red pigment. It was found that such a black inkjet ink allowed easier and better colour management for wood colours.

In a particularly preferred embodiment of the ink sets described above, at least three aqueous pigmented inkjet inks include one or more pigments selected from the group consisting of carbon black, C.I. Pigment Blue 15:3, C.I. Pigment Blue 15:4, C.I. Pigment Yellow 150, C.I Pigment Yellow 151, C.I. Pigment Yellow 180, C.I. Pigment Yellow 74, C.I Pigment Red 254, C.I. Pigment Red 176, C.I. Pigment Red 122, and mixed crystals thereof. It was found that in such a case, very lightstable colour patterns could be obtained.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink should be between 0.005 µm and 15 µm. Preferably, the average pigment particle size is between 0.005 and 5 µm, more preferably between 0.005 and 1 µm, particularly preferably between 0.005 and 0.3 µm and most preferably between 0.040 and 0.150 µm.

The pigment is used in the pigmented inkjet ink in an amount of 0.1 to 20 wt %, preferably 1 to 10 wt %, and most preferably 2 to 5 wt % based on the total weight of the pigmented inkjet ink. A pigment concentration of at least 2 wt % is preferred to reduce the amount of inkjet ink needed to produce the colour pattern, while a pigment concentration higher than 5 wt % reduces the colour gamut for printing the colour pattern with print heads having a nozzle diameter of 20 to 50 µm.

Dispersants

The pigmented inkjet ink may contain a dispersant, preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOL- SPERSE™ dispersants available from ZENECA. A detailed list of non-polymeric as well as some polymeric dispersants is disclosed by M C CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polymeric dispersity PD smaller than 2, more preferably smaller than 1.75 and most preferably smaller than 1.5.

Commercial examples of polymeric dispersants are the following:
  DISPERBYK™ dispersants available from BYK CHEMIE GMBH;
  SOLSPERSE™ dispersants available from NOVEON;
  TEGO™ DISPERS™ dispersants from DEGUSSA;
  EDAPLAN™ dispersants from MÜNZING CHEMIE;
  ETHACRYL™ dispersants from LYONDELL;
  GANEX™ dispersants from ISP;
  DISPEX™ and EFKA™ dispersants from CIBA SPECIALTY CHEMICALS INC;
  DISPONER™ dispersants from DEUCHEM; and
  JONCRYL™ dispersants from JOHNSON POLYMER.

Particularly preferred for non-aqueous ink jet inks include Solsperse™ dispersants from NOVEON, Efka™ dispersants from CIBA SPECIALTY CHEMICALS INC and Disperbyk™ dispersants from BYK CHEMIE GMBH.

Particularly preferred dispersants for solvent based pigment dispersions are Solsperse™ 32000 and 39000 from NOVEON.

The polymeric dispersant is preferably used in the pigment dispersion in an amount of 2 to 600 wt %, more preferably 5 to 200 wt % based on the weight of the pigment.

In a particularly preferred embodiment, the polymeric dispersant used in an aqueous pigmented inkjet ink is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MÜNZING.

Organic Solvents

An organic solvent may be advantageously included in the aqueous pigment inkjet inks for several reasons, for example as humectant.

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof.

Preferred humectants are 2-pyrrolidone, glycerol and 1,2-hexanediol, since the latter were found to be the most effective for improving inkjet printing reliability in an industrial environment.

The humectant is preferably added to the aqueous pigmented inkjet ink in an amount of 0.1 to 35 wt %, more preferably 1 to 30 wt %, and most preferably 3 to 25 wt % based on the total weight of the aqueous pigmented inkjet ink.

Polymer Latex Binders

The aqueous pigmented inkjet inks may contain a polymeric latex binder.

The polymer latex is not particularly limited as long as it has stable dispersibility in the ink composition. There is no limitation on the main chain skeleton of the water-insoluble polymer. Examples of the polymer include a vinyl polymer and a condensed polymer (e.g., an epoxy resin, polyester, polyurethane, polyamide, cellulose, polyether, polyurea, polyimide, and polycarbonate). Among the above, a vinyl polymer is particularly preferable because of easily controlled synthesis.

In a particularly preferred embodiment the polymer latex is a polyurethane latex, more preferably a self-dispersible polyurethane latex. The polymer latex binder in the one or more aqueous inkjet inks is preferably a polyurethane based latex binder for reasons of compatibility with the thermosetting resin.

The polymer latex in the invention is preferably a self-dispersing polymer latex, and more preferably a self-dispersing polymer latex having a carboxyl group, from the viewpoint of ejecting stability and stability of the liquid (particularly, dispersion stability) when using a colour pigment. The self-dispersing polymer latex means a latex of a water-insoluble polymer that does not contain a free emulsifier and that can get into a dispersed state in an aqueous medium even in the absence of other surfactants due to a functional group (particularly, an acidic group or a salt thereof) that the polymer itself has.

In preparing a self-dispersing polymer latex, preferably a monomer is used selected from the group consisting of an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

The latex binder polymer particles preferably have a glass transition temperature (Tg) of 30° C. or more.

The minimum film-forming temperature (MFT) of the polymer latex is preferably −25 to 150° C., and more preferably 35 to 130° C.

Biocides

Suitable biocides for the aqueous inkjet inks include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added in an amount of 0.001 to 3.0 wt. %, more preferably 0.01 to 1.0 wt. %, each based on the total weight of the aqueous pigmented inkjet ink.

Surfactants

The one or more aqueous pigmented inkjet inks may contain at least one surfactant. The surfactant(s) can be anionic, cationic, non-ionic, or zwitter-ionic and are usually added in a total quantity less than 5 wt % based on the total weight of the inkjet ink and particularly in a total less than 2 wt % based on the total weight of the inkjet ink.

The one or more pigmented inkjet inks preferably have a surface tension between 18.0 and 45.0 mN/m at 25° C., more preferably between a surface tension between 21.0 and 39.0 mN/m at 25° C.

Suitable surfactants for the pigmented inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and/or silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes. Preferred commercial silicone surfactants include BYK™ 333 and BYK™ UV3510 from BYK Chemie.

A particularly preferred commercial fluorosurfactant is Capstone™ FS3100 from DU PONT.

pH Adjusters

The aqueous inkjet inks may contain at least one pH adjuster. Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are triethanol amine, NaOH and H$_2$SO$_4$.

Preparation of Inkjet Inks

The one or more pigmented inkjet inks may be prepared by precipitating or milling the colour pigment in the dispersion medium in the presence of the polymeric dispersant, or simply by mixing a self-dispersible colour pigment in the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. The pigment is usually present in the mill grind at 1 to 50 wt %, excluding the milling media. The weight ratio of pigment over dispersant is 20:1 to 1:2.

The milling time can vary widely and depends upon the pigment, mechanical means and residence conditions selected, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application.

EXAMPLES

Materials

All materials used in the following examples were readily available from standard sources such as Aldrich Chemical Co. (Belgium) and Acros (Belgium) unless otherwise specified. The water used was demineralized water.

PR254 is the abbreviation for C.I. Pigment Red 254 for which Irgazin™ DPP Red BTR from Ciba Specialty Chemicals was used.

Edaplan is an abbreviation used for Edaplan™ 482, a polymeric dispersant from MUNZING.

Proxel is an abbreviation used for the biocide Proxel™ Ultra 5 from AVECIA.

PEG 200 is a polyethylene glycol having an average molecular mass of 200 from CLARIANT.

TEA is triethanol amine.

Syloid™ 72 is a synthetic, amorphous silica appearing as a white free flowing powder available from GRACE.

PVA-sol is a 7.5 wt % solution of a polyvinylalcohol polymer Erkol™ W48/20 available from ERKOL.

Measurement Methods

1. Surface Tension

The static surface tension of the aqueous inkjet inks was measured with a KRÜSS tensiometer K9 from KRÜSS GmbH, Germany at 25° C. after 60 seconds.

2. Viscosity

The viscosity of an inkjet ink was measured, using a Brookfield DV-II+ viscometer at 32° C. at a shear rate of 1,000 s$^{-1}$.

3. Average Particle Size

An ink sample is diluted with ethyl acetate to a pigment concentration of 0.002 wt %. The average particle size of pigment particles is determined with a Nicomp™ 30 Submicron Particle Analyzer based upon the principle of dynamic light scattering.

For good ink jet characteristics (jetting and print quality) the average particle size of the dispersed particles is preferably below 250 nm.

4. Sharpness (S)

The sharpness of a printed image after the DPL process was evaluated in accordance with a criterion on a scale of 0 to 6 as described in Table 1.

TABLE 1

| Criterion | Observation |
| --- | --- |
| 0 | Unacceptable, completely distorted image |
| 1 | Very bad, very rough unsharp edges |
| 2 | Bad, rough edges |
| 3 | Acceptable sharpness |
| 4 | Good sharpness |
| 5 | Very good sharpness |
| 6 | Excellent sharpness |

5. Ink Bleeding (IB)

The colour bleeding of inks occurs due to the water vapour produced during the DPL process, which deplaces colour pigments. An evaluation was made in accordance with a criterion on a scale of 0 to 6 as described in Table 2.

TABLE 2

| Criterion | Observation |
| --- | --- |
| 0 | Unacceptable, completely distorted image |
| 1 | Very bad, very large amount of bleeding visible by the naked eye |
| 2 | Bad, large amount of bleeding visible by the naked eye |
| 3 | Acceptable, some bleeding visible by the naked eye |
| 4 | Good, almost no bleeding visible by the naked eye |
| 5 | Very good, some bleeding visible by microscope |
| 6 | Excellent, no bleeding visible by microscope |

6. Homogeneity (H)

The homogeneity was evaluated on a binary scale (OK/Not OK) in rectangles of 9 cm×2.5 cm present in a technical colour pattern.

7. Adhesion (A)

Adhesion is evaluated by a cross-cut test according to ISO2409:1992(E). Paints. International standard. 1992-08-15. using a Braive No. 1536 Cross Cut Tester from BRAIVE INSTRUMENTS with spacing of a 1 mm between cuts and using a weight of 600 g, in combination with a Tesatape™ 4104 PVC tape. The evaluation was made in accordance with a criterion described by Table 3.

TABLE 3

| Criterion | Observation |
| --- | --- |
| 0 | The edges of the cuts are completely smooth: none of the squares of the lattice is detached (=perfect adhesion). |
| 1 | Detachment of small flakes at the intersections of the cuts. A cross-cut area not greater than 5% is affected. |
| 2 | Flaked along the edges and/or at the intersections of the cuts. A cross-cut area greater than 5%, but not significantly greater than 15%, is affected. |
| 3 | Flaked along the edges of the cuts partly or wholly in large ribbons, and/or it has flaked partly or wholly on different parts of the squares. A cross-cut area significantly greater than 15%, but not significantly greater than 35%, is affected. |
| 4 | Flaked along the edges of the cuts in large ribbons, and/or some of the squares has detached partly or wholly. A cross-cut area significantly greater than 35%, but not significantly greater than 65%, is affected. |
| 5 | Any degree of flaking that cannot even be classified by classification 4 |

Example 1

This example illustrates the necessity for having a weight ratio P/B of inorganic pigment P to polymeric binder B larger than 1.5 in the ink acceptance layer.

Preparation of Aqueous Pigmented Inkjet Ink

A concentrated aqueous pigment dispersion was made by mixing a composition according to Table 4 for 30 minutes using a Disperlux™ Yellow mixer.

TABLE 4

| Component | Concentration (wt %) |
| --- | --- |
| PR254 | 15.00 |
| Edaplan | 15.00 |
| Proxel | 0.02 |
| Water | to complete 100.00 wt % |

The concentrated aqueous pigment dispersion was then milled using a Dynomill™ KDL with 0.04 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The concentrated aqueous pigment dispersion served as the basis for the preparation of the inkjet ink.

A red pigmented inkjet ink "Ink R" was prepared by diluting the concentrated pigment dispersion with the other ink components according to Table 7, wherein the weight % is based on the total weight of the ink. The component TEA was used to set the pH to 8.2. Water was added to complete the ink to the desired pigment concentration.

TABLE 5

| Component (in wt %) | Ink R |
| --- | --- |
| PR254 | 2.70 |
| Edaplan | 2.70 |
| 1,2-Hexanediol | 3.00 |
| Glycerine | 20.00 |
| PEG 200 | 18.00 |
| Proxel | 0.01 |
| TEA | 0.50 |
| Water | to complete 100.00 wt % |
| Viscosity at 32° C. | 5.3 mPa · s |
| Surface Tension | 35.6 mN/m |
| Average particle size | 150 nm |

Preparation of Ink Acceptance Layers

The liquids IAL-1 to IAL-4 were all prepared in the same manner using the amounts listed in Table 6. The inorganic pigment Syloid™ 72 was dispersed for 30 minutes using a Disperlux™ mixer in PVA-sol. Ammonia was added to the dispersion to raise the pH above 8.0. The pH of each liquid was measured at 25° C.

TABLE 6

| g of Component | IAL-1 | IAL-2 | IAL-3 | IAL-4 |
| --- | --- | --- | --- | --- |
| PVA-sol | 88.89 | 66.67 | 44.44 | 26.67 |
| Syloid ™ 72 | 3.33 | 5.00 | 6.67 | 8.00 |
| Ammonia | 0.24 | 0.30 | 0.29 | 0.29 |
| Water | 7.54 | 28.03 | 48.60 | 65.04 |
| pH | 8.9 | 8.4 | 8.2 | 8.4 |

The liquid IAL-5 was prepared by diluting 83 g of PVA-sol with 968 g of water. No inorganic pigment was included in IAL-5.

An 80 g/m² porous paper used for decor printing was impregnated with an aqueous solution containing 60 wt % of melamine-formaldehyde based resin having a formaldehyde to melamine ratio of 1.7, and dried to a residual humidity of about 8 g/m².

An ink acceptance layer was coated on the impregnated paper in accordance with Table 7 by means of a bar coater, providing a wet layer thickness of 20 μm or 40 μm micron. The coated samples were dried in an oven for 1 minute at 125° C.

TABLE 7

| | | Ink Acceptance Layer | |
| --- | --- | --- | --- |
| Sample | Liquid | Wet layer thickness (μm) | Dry Weight (g/m²) |
| COMP-1 | IAL-1 | 40 | 4.0 |
| COMP-2 | IAL-2 | 40 | 4.0 |
| INV-1 | IAL-3 | 40 | 4.0 |
| INV-2 | IAL-4 | 40 | 4.0 |
| INV-3 | IAL-3 | 20 | 2.0 |
| INV-4 | IAL-4 | 20 | 2.0 |
| COMP-3 | IAL-5 | 40 | 3.2 |
| COMP-4 | IAL-5 | 20 | 1.6 |
| COMP-5 | IAL-1 | 40 | 4.0 |
| COMP-6 | IAL-2 | 40 | 4.0 |
| INV-5 | IAL-3 | 40 | 4.0 |
| INV-6 | IAL-4 | 40 | 4.0 |
| COMP-7 | IAL-5 | 40 | 3.2 |
| COMP-8 | IAL-1 | 40 | 4.0 |
| COMP-9 | IAL-2 | 40 | 4.0 |
| INV-7 | IAL-3 | 40 | 4.0 |
| INV-8 | IAL-4 | 40 | 4.0 |
| COMP-10 | IAL-5 | 40 | 3.2 |

Results and Evaluation

Decorative layers were obtained according to Table 8 by printing a technical colour pattern on the melamine-formaldehyde based resin impregnated paper using droplets smaller than 10 pL of the Ink R with a KJ4B Kyocera print head at a head temperature of 32° C. at 600 dpi. The printed samples were dried for 30 minutes at 50° C. The amount of jetted colour pigment C (=PR254) is listed in Table 6 as g C/m². The P/B ratio is the weight ratio of the inorganic pigment P (=Syloid™ 72) over the polymeric binder from the PVA-sol.

An assembly was made as shown in FIG. 3, wherein the prepared decorative layer was interposed between a HDF core and a protective layer of unprinted melamine-formaldehyde resin impregnated paper containing aluminium oxide for durability. The assembly was then heat pressed for 20 seconds at 195° C. into a laminate by a DPL process using 138 bar and 50 kg/cm² as settings.

The resulting floor laminates were examined for sharpness (S), ink bleeding (IB), homogeneity (H) and adhesion (A). The results are shown in Table 6.

TABLE 8

| Sample | P/B ratio | Ink g C/m² | Evaluation (S) | (IB) | (H) | (A) |
| --- | --- | --- | --- | --- | --- | --- |
| COMP-1 | 0.5 | 0.18 | 1 | 1 | Not OK | 5 |
| COMP-2 | 1.0 | 0.18 | 2 | 2 | OK | 5 |
| INV-1 | 2.0 | 0.18 | 4 | 4 | OK | 5 |
| INV-2 | 4.0 | 0.18 | 6 | 5 | OK | 5 |
| INV-3 | 2.0 | 0.18 | 3 | 4 | OK | 5 |
| INV-4 | 4.0 | 0.18 | 4 | 5 | OK | 5 |
| COMP-3 | 0.0 | 0.18 | 6 | 2 | Not OK | 5 |
| COMP-4 | 0.0 | 0.18 | 6 | 4 | Not OK | 5 |
| COMP-5 | 0.5 | 0.36 | 0 | 0 | Not OK | 5 |
| COMP-6 | 1.0 | 0.36 | 1 | 1 | Not OK | 5 |
| INV-5 | 2.0 | 0.36 | 3 | 4 | OK | 5 |
| INV-6 | 4.0 | 0.36 | 5 | 4 | OK | 5 |
| COMP-7 | 0.0 | 0.36 | 5 | 5 | Not OK | 5 |
| COMP-8 | 0.5 | 0.54 | 0 | 0 | Not OK | 5 |
| COMP-9 | 1.0 | 0.54 | 1 | 0 | Not OK | 5 |
| INV-7 | 2.0 | 0.54 | 3 | 4 | OK | 5 |
| INV-8 | 4.0 | 0.54 | 4 | 4 | OK | 5 |
| COMP-10 | 0.0 | 0.54 | 5 | 3 | Not OK | 5 |

From Table 8, it should be clear that good results are obtained for sharpness, ink bleeding, homogeneity and adhesion if the P/B ratio is higher than 1.5.

All the ink acceptance layers of the above examples were coated by means of a bar coater, as it was cumbersome to swap the liquids in a valve jet print head and clean the supply unit of the liquid in the inkjet printing device. However, to demonstrate the printability of the ink acceptance layer, the liquid IAL-3 used for preparing the inventive samples INV-1, INV-3, INV-5 and INV-7 was loaded in a custom built inkjet printing device equipped with HSV8000 valve jet print heads from ZIMMER. Printing was performed at a jetting temperature of 21° C. using an operating pressure of 1 bar. On the same impregnated paper as used above, an ink acceptance layer was printed having a general thickness of 20 μm with local thickness differences of 20 μm. Such a local thickness difference can, for example, be advantageously exploited when printing a dark brown pattern in wood grain. In the latter case, it is necessary to include the print heads for jetting droplets having a volume of 1 to 200 nL and those for jetting ink droplets having a volume of up to 30 pL in one and the same inkjet printing device to allow for accurate placement of the aqueous pigmented inkjet inks on the locally thicker ink acceptance layer.

REFERENCE SIGNS LIST

TABLE 9

| 11 | Paper manufacturer |
| --- | --- |
| 12 | Paper roll |
| 13 | Decor printer |
| 14 | Gravure printing |
| 15 | Inkjet printing |
| 16 | Decor Paper roll |
| 17 | Warehouse |
| 18 | Impregnation |

TABLE 9-continued

| | |
|---|---|
| 19 | Cutting to size |
| 20 | Floor laminate manufacturer |
| 21 | Floor laminate |
| 22 | Printing ink acceptance layer |
| 30 | Decorative panel |
| 31 | Core layer |
| 32 | Groove |
| 33 | Tongue |
| 34 | Decorative layer |
| 35 | Protective layer |
| 36 | Balancing layer |

The invention claimed is:

1. A manufacturing method of decorative laminates comprising the steps of:
    printing an ink acceptance layer by jetting droplets having a volume of 1 to 200 nL onto a paper substrate;
    forming a decorative layer by jetting ink droplets having a volume up to 30 pL of at least one aqueous pigmented inkjet ink onto the ink acceptance layer; and
    heat pressing the decorative layer onto a decorative laminate; wherein
    the ink acceptance layer includes an inorganic pigment P and a polymeric binder B at a weight ratio P/B larger than 1.5; and
    the step of heat pressing the decorative layer onto the decorative laminate includes embossing a relief into the decorative laminate.

2. The method according to claim 1, wherein the paper substrate is impregnated with a thermosetting resin prior to the step of printing the ink acceptance layer.

3. The method according to claim 1, wherein the droplets forming the ink acceptance layer are jetted using a valve jet print head, a piezoneedle print head, or a through flow print head.

4. The method according to claim 1, wherein a thickness of the ink acceptance layer varies over a width of the paper substrate by at least 10%.

5. The method according to claim 2, wherein the thermosetting resin is selected from a group consisting of melamine-formaldehyde based resins, ureum-formaldehyde based resins, and phenol-formaldehyde based resins.

6. The method according to claim 1, wherein the inorganic pigment P is selected from the group consisting of alumina hydrates, aluminum oxides, aluminum hydroxides, aluminum silicates, and silicas.

7. A manufacturing method of decorative laminates comprising the steps of:
    printing an ink acceptance layer by jetting droplets having a volume of 1 to 200 nL onto a paper substrate;
    forming a decorative layer by jetting ink droplets having a volume up to 30 pL of at least one aqueous pigmented inkjet ink onto the ink acceptance layer; and
    heat pressing the decorative layer onto a decorative laminate; wherein
    the ink acceptance layer includes an inorganic pigment P and a polymeric binder B at a weight ratio P/B larger than 1.5; and
    the step of printing the ink acceptance layer includes printing the ink acceptance layer in a single pass inkjet printing mode.

8. A manufacturing method of decorative laminates comprising the steps of:
    printing an ink acceptance layer by jetting droplets having a volume of 1 to 200 nL onto a paper substrate;
    forming a decorative layer by jetting ink droplets having a volume up to 30 pL of at least one aqueous pigmented inkjet ink onto the ink acceptance layer; and
    heat pressing the decorative layer onto a decorative laminate; wherein
    the ink acceptance layer includes an inorganic pigment P and a polymeric binder B at a weight ratio P/B larger than 1.5; and
    the step of forming the decorative layer includes jetting the ink droplets in a single pass inkjet printing mode.

9. A manufacturing method of decorative laminates comprising the steps of:
    printing an ink acceptance layer by jetting droplets having a volume of 1 to 200 nL onto a paper substrate;
    forming a decorative layer by jetting ink droplets having a volume up to 30 pL of at least one aqueous pigmented inkjet ink onto the ink acceptance layer; and
    heat pressing the decorative layer onto a decorative laminate; wherein
    the ink acceptance layer includes an inorganic pigment P and a polymeric binder B at a weight ratio P/B larger than 1.5; and
    the paper substrate is a bulk colored paper.

10. A manufacturing method of decorative laminates comprising the steps of:
    printing an ink acceptance layer by jetting droplets having a volume of 1 to 200 nL onto a paper substrate;
    forming a decorative layer by jetting ink droplets having a volume up to 30 pL of at least one aqueous pigmented inkjet ink onto the ink acceptance layer; and
    heat pressing the decorative layer onto a decorative laminate; wherein the ink acceptance layer includes an inorganic pigment P and a polymeric binder B at a weight ratio P/B larger than 1.5; and
    the at least one aqueous pigmented inkjet ink includes at least three aqueous pigmented inkjet inks including at least one pigment selected from the group consisting of carbon black, C.I. Pigment Blue 15:3, C.I. Pigment Blue 15:4, C.I Pigment Yellow 150, C.I Pigment Yellow 151, C.I. Pigment Yellow 180, C.I. Pigment Yellow 74, C.I Pigment Red 254, C.I. Pigment Red 176, C.I. Pigment Red 122, and mixed crystals thereof.

11. A manufacturing method of decorative laminates comprising the steps of:
    printing an ink acceptance layer by jetting droplets having a volume of 1 to 200 nL onto a paper substrate;
    forming a decorative layer by jetting ink droplets having a volume up to 30 pL of at least one aqueous pigmented inkjet ink onto the ink acceptance layer; and
    heat pressing the decorative layer onto a decorative laminate; wherein
    the ink acceptance layer includes an inorganic pigment P and a polymeric binder B at a weight ratio P/B larger than 1.5; and
    the decorative laminate includes a tongue and groove joint that requires no glue.

* * * * *